United States Patent [19]
Ashley et al.

[11] Patent Number: 5,376,830
[45] Date of Patent: Dec. 27, 1994

[54] HIGH FREQUENCY SLOPE COMPENSATION CIRCUIT FOR CURRENT PROGRAMMED CONVERTER

[75] Inventors: Donald J. Ashley, Endicott, N.Y.; Michael J. Johnson, Raleigh, N.C.; David R. Thomas, Cynthiana, Ky.

[73] Assignee: International Business Machines Corporation, Armonk, N.Y.

[21] Appl. No.: 124,323

[22] Filed: Sep. 17, 1993

[51] Int. Cl.5 .............................................. H03K 5/12
[52] U.S. Cl. ..................................... 327/134; 327/170
[58] Field of Search ............... 307/263, 261, 228, 490, 307/491, 494, 246, 359; 328/13; 323/288

[56] References Cited

U.S. PATENT DOCUMENTS

| | | | |
|---|---|---|---|
| 3,675,114 | 7/1972 | Nercessian | 323/9 |
| 4,035,715 | 7/1977 | Wyman et al. | 323/4 |
| 4,195,333 | 3/1980 | Hedel | 363/21 |
| 4,257,070 | 3/1981 | Sommer et al. | 358/282 |
| 4,276,590 | 6/1981 | Hansel et al. | 363/71 |
| 4,308,468 | 12/1981 | Olson | 307/353 |
| 4,414,598 | 11/1983 | Nowell | 361/18 |
| 4,415,960 | 11/1983 | Clark, Jr. | 363/21 |
| 4,425,613 | 1/1984 | Shelly | 363/26 |
| 4,511,814 | 4/1985 | Matsuo et al. | 307/572 |
| 4,542,305 | 9/1985 | Blauschild | 307/353 |
| 4,609,828 | 9/1986 | Small | 307/44 |
| 4,618,779 | 10/1986 | Wiscombe | 307/60 |
| 4,635,178 | 1/1987 | Greenhalgh | 363/65 |
| 4,675,555 | 6/1987 | Okajima et al. | 307/455 |
| 4,717,833 | 1/1988 | Small | 307/44 |
| 4,734,844 | 3/1988 | Rhoads | 363/72 |
| 4,760,276 | 7/1988 | Lethellier | 307/18 |
| 4,766,364 | 8/1988 | Biamonte et al. | 323/272 |
| 4,856,023 | 8/1989 | Singh | 375/3 |
| 4,866,295 | 9/1989 | Leventis et al. | 307/43 |
| 4,877,972 | 10/1989 | Sobhani et al. | 307/43 |
| 4,924,170 | 5/1990 | Henze | 323/272 |
| 4,939,393 | 7/1990 | Petty | 307/475 |
| 5,010,470 | 4/1991 | Lipman et al. | 363/132 |
| 5,014,179 | 5/1991 | Latos | 363/56 |
| 5,023,746 | 6/1991 | Epstein | 361/56 |
| 5,027,255 | 6/1991 | Zeitlin et al. | 361/395 |
| 5,036,452 | 7/1991 | Loftus | 363/71 |
| 5,043,603 | 8/1991 | Ohba et al. | 307/455 |
| 5,051,608 | 9/1991 | Pierick et al. | 307/261 |
| 5,087,871 | 2/1992 | Losel | 323/299 |
| 5,136,183 | 8/1992 | Moyal et al. | 307/355 |
| 5,142,168 | 8/1992 | Matsunaga | 307/446 |
| 5,157,269 | 10/1992 | Jordan et al. | 307/59 |
| 5,164,890 | 11/1992 | Nakagawa et al. | 363/65 |
| 5,200,643 | 4/1993 | Brown | 307/53 |
| 5,204,809 | 4/1993 | Andresen | 363/132 |

FOREIGN PATENT DOCUMENTS

| | | | |
|---|---|---|---|
| 2012501 | 1/1979 | United Kingdom . | |
| 1394415 | 5/1988 | U.S.S.R. | 307/228 |
| 1706020 | 1/1992 | U.S.S.R. | 307/228 |

Primary Examiner—William L. Sikes
Assistant Examiner—James Dudek
Attorney, Agent, or Firm—William H. Steinberg; Arthur J. Samodovitz

[57] ABSTRACT

A slope compensation circuit for use with current-programmed switching DC to DC converters is provided which allows operation of the switching converters in the 1-2 MHz range. The circuit avoids feedback of an output voltage which includes the effects of a partially discharged slope capacitor without adding unnecessary delay by using a switch to bypass the discharging slope capacitor and coupling an input stage of the slope compensation circuit to an output driver. A delay in feeding back the output of the slope compensation circuit is provided to assure that the bypassing switch has settled.

4 Claims, 2 Drawing Sheets

HIGH FREQUENCY SLOPE COMPENSATION CIRCUIT FOR CURRENT PROGRAMMED CONVERTER

CROSS REFERENCE TO RELATED APPLICATIONS

The present application is related to copending applications Ser. No. (EN993019) entitled "Current Share Circuit For DC To DC Converters" and Ser. No. (EN993021) entitled "Electronic Switch Having Programmable Means To Reduce Noise Coupling" both assigned to the same assignee as the present invention and both incorporated by reference herein.

BACKGROUND OF THE INVENTION

The present invention relates to slope compensation for the stabilization of current-programmed converters and more particularly to the slope compensation of current programmed converters at high frequencies.

Hsu, Brown, Resnick, and Middlebrook in their paper "Modelling and Analysis of Switching DC-To-DC Converters In Constant-Frequency Current-Programmed Mode, IEEE Power Electronics Specialists Conference Jan. 1979, pp. 284–301 describe the method of slope compensation for the stabilization of current-programmed converters of duty ratios above 50%. The same technique can be used to improve noise immunity at any duty ratio. Circuitry is used to generate a periodic sawtooth ramp signal which is added to an input signal (the programmed threshold) which varies slowly compared to the sawtooth period. Referring to FIG. 1, a capacitor 5 can be inverted between the input stage shown as a differential amplifier 6 and the output driver 7. A constant current is forced through the capacitor 5, which results in a linear voltage ramp across capacitor 5. Capacitor 5 is then discharged periodically by a switched resistance 9, resulting in an additive sawtooth wave being presented to the output driver 7. If the output, minus the added ramp is to accurately follow the input signal over a wide range of output currents, then feedback must be employed. To avoid having the feedback negate the effects of the added ramp, the output can be sampled during the time that capacitor 5 is discharged using switch 11 and hold capacitor 13.

At switching frequencies above 1 MHz, several problems are encountered with the sampling technique described above. Discharging the capacitor 5 takes some time. The feedback sampling circuit must either delay sampling, which limits the operating frequency attainable, or else the sampling circuit feeds back a degraded signal, which includes the effects of the uncompleted discharge of the capacitor. If a delay is included to avoid feeding back a partially discharged capacitor voltage, then there is no convenient electronic indication of how long the delay should last. Either a conservative, long delay must be used, or else the sampling circuit could again feed back a degraded signal with the discharge of the capacitor not being completed.

If the command current used to charge the capacitor to generate the sawtooth waveform is to be controlled externally, then the command current must be great enough for off chip use, typically greater than a few microamps. If external resistors are used to generate the current, then the resistance must be small compared to board leakage paths and possible external contamination, typically having a resistance value of less than a few Megohms. Given such a current or current generated by a restricted range of resistance, for a given range of desired slopes, a minimum size requirement is placed on the slope-generating capacitor, which may result in a value impractical for on-chip implementation.

It is an object of the present invention to provide a slope compensation circuit which allows operation at higher frequencies of 1-2 MHz.

It is another object of the present invention to provide a slope compensation circuit which avoids feedback of an output voltage which includes the effects of a partially discharged slope capacitor without adding unnecessary delay.

It is a still further object of the present invention to provide a slope compensation circuit which limits the size of the on-chip capacitor in an integrated implementation while maintaining workable values of off-chip current and resistance to generate command currents for controlling the slope of saw tooth waveforms.

SUMMARY OF THE INVENTION

In one aspect of the present invention, a slope compensation circuit is provided having an input stage for comparing a feedback signal with a command signal. An output driver furnishes an output command with a periodic sawtooth ramp and furnishes the feedback signal. Constant current means charge a slope-generating capacitor which is periodically discharged by a switched resistance connected across the slope-generating capacitor. First switch means connect and disconnect the slope-compensating capacitor from the output driver. The first switch means disconnect the slope generating capacitor from the output driver when the slope-generating capacitor is being discharged. Second switch means bypass the slope generating capacitor and connect the input stage to the output driver when the slope-generating capacitor is being discharged. A hold capacitor receives the feedback signal from the output driver when the slope compensating capacitor is being bypassed and provides the signal to the input stage.

In another aspect of the present invention a circuit is provided including a current programmed switching DC to DC converter having a semiconductor switch for controlling the transfer of power from the input to the output of the converter and having comparison means for comparing a signal representative of semiconductor switch current or other controlled current to a threshold signal for determining when to turn off the semiconductor switch. A slope compensation circuit generates the threshold signal. The slope compensation circuit includes an input stage for comparing a feedback signal with a command signal. An output driver provides an output command with a periodic sawtooth ramp and provides the feedback signal. Constant current means charge a slope-generating capacitor which is periodically discharged by a switched resistance connected across the slope-generating capacitor. First switch means connect and disconnect the slope-compensating capacitor from the output driver. The first switch means disconnects the slope generating capacitor from the output driver when the slope-generating capacitor is being discharged. Second switch means bypass the slope generating capacitor and connect the input stage to the output driver when the slope-generating capacitor is being discharged. A hold capacitor receives the feedback signal from the output driver when the slope compensating capacitor is being bypassed and provides the signal to the input stage. The means for periodically discharging the slope-generating capacitor functions when the semiconductor switch is not conducting.

DETAILED DESCRIPTION OF THE INVENTION

Figure 2:
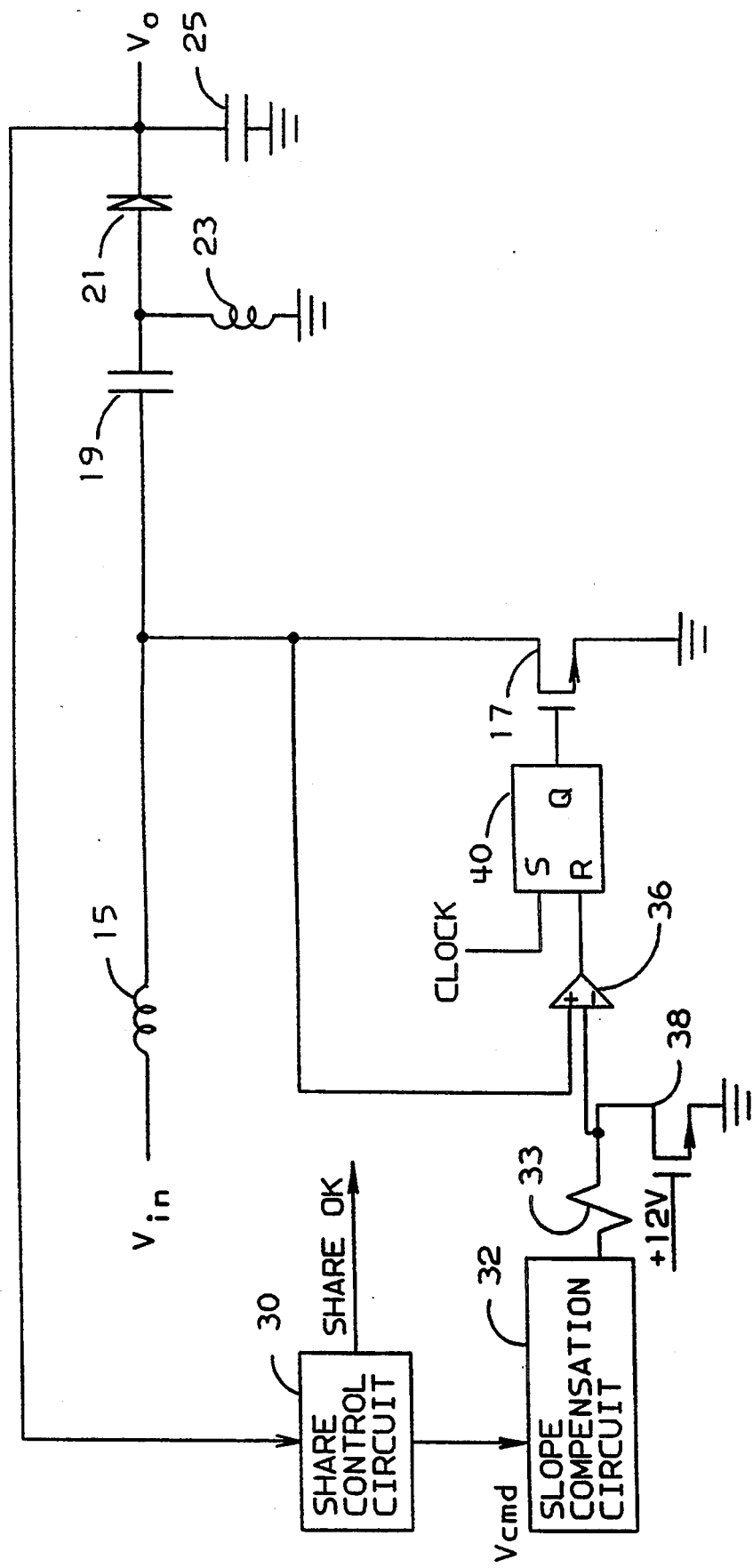
FIG. 2 is a circuit diagram of a current programmed single-ended primary inductance converter (SEPIC) in which the high-frequency slope compensation circuit can be used.

Referring now to FIG. 2, a current-programmed single-ended primary inductance converter is shown. A DC input voltage is provided at $V_{in}$ through an inductor 15 and through an N-channel FET 17 to ground, with the source of the FET connected to ground. The junction of inductor 15 and FET 17 is connected through a capacitor 19 and a diode 21 to the output of the converter $V_o$, with the anode of diode 21 connected to capacitor 19. The junction of capacitor 19 and diode 21 is connected through an inductor 23 to ground. The cathode of the diode 21 is connected through an output capacitor 25 to ground. The output voltage is supplied to a share control circuit 30 which is described in more detail in copending application Ser. No.(EN993019). The share control circuit includes a transconductance amplifier which compares the output voltage to a reference voltage. The output of the transconductance amplifier is passed through a slope compensation circuit 32, explained in more detail hereinafter, and then through a resistor 33 to the inverting input of a high speed comparator 36. The inverting input of comparator is also connected through an N-channel FET drain pilot transistor 38 to ground. The gate of FET 38 is connected to a voltage so that FET 38 is always conducting. The drain pilot transistor 38 is integrated into the same region of the semiconductor layer of transistor 17. Consequently, as the main power transistor 17 heats up due to load current, the reference pilot transistor 38 heats up to substantially the same temperature. The pilot transistor 38 provides a variable resistance which tracks the changes in resistance in the main Dower transistor 17. Since the voltage drop across the main power transistor 17 is being monitored to determine the current through it, adjusting the reference pilot transistor for 38 for changes in resistance in transistor 17 permits accurate current sensing. An example of a temperature monitoring pilot transistor is shown in copending application Ser. No. 07/782,833, filed Oct. 24, 1991, entitled "Temperature Monitoring Pilot Transistor" and assigned to the same assignee as the present invention. Ser. No. 07/782,833 is hereby incorporated by reference. The drain of FET 17 is connected to the noninverting input of comparator 36. The output of the comparator 36 is connected to the reset input of a set/reset flip flop 40. A clock signal is connected to the set input of flip flop 40. The noninverted output Q of the flip flop is connected to the gate of FET 17. The main transistor 17 switching is controlled by a pwm current mode controller which generates a current threshold for determining when to switch the main power transistor 17 in the corresponding converter. This is achieved by comparing the voltage drop across the pilot transistor 38 connected to the error voltage output from the share control circuit modified by the slope compensation circuitry 32 and feed through resistor 33, to the voltage drop across transistor 17. The current threshold determines pulse width by determining the on-time of transistor 17.

Figure 1:
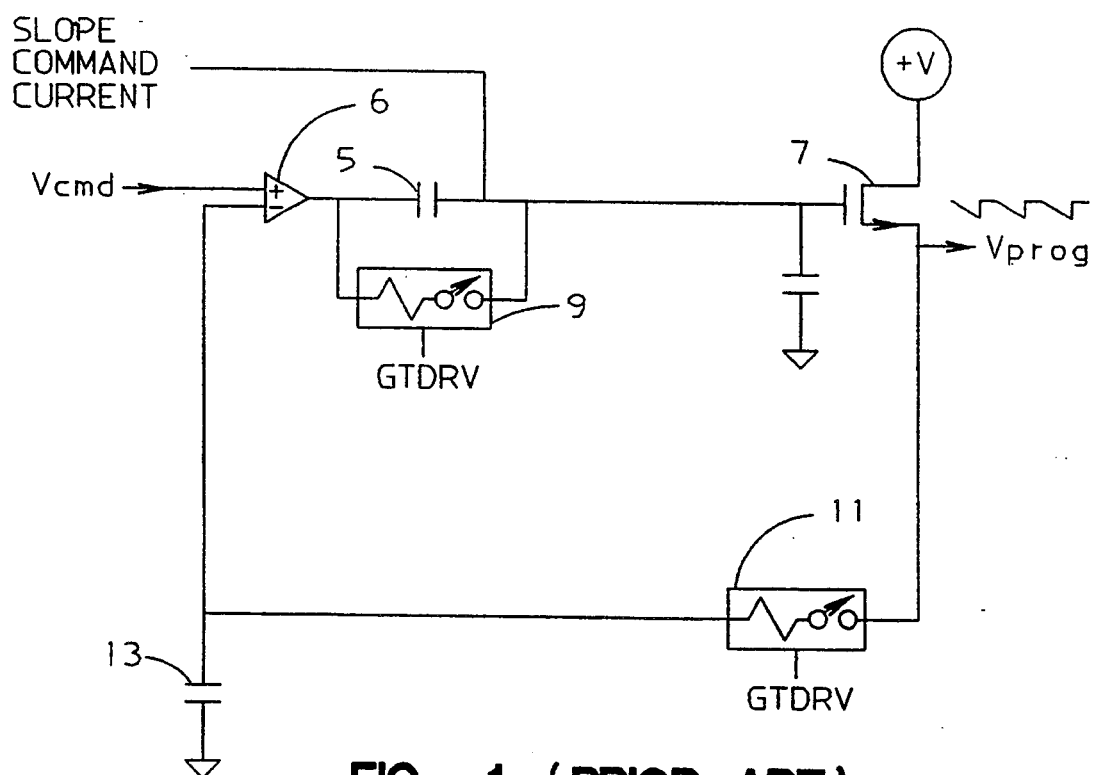
FIG. 1 is schematic wiring diagram of a prior art slope compensation circuit.
Figure 3:
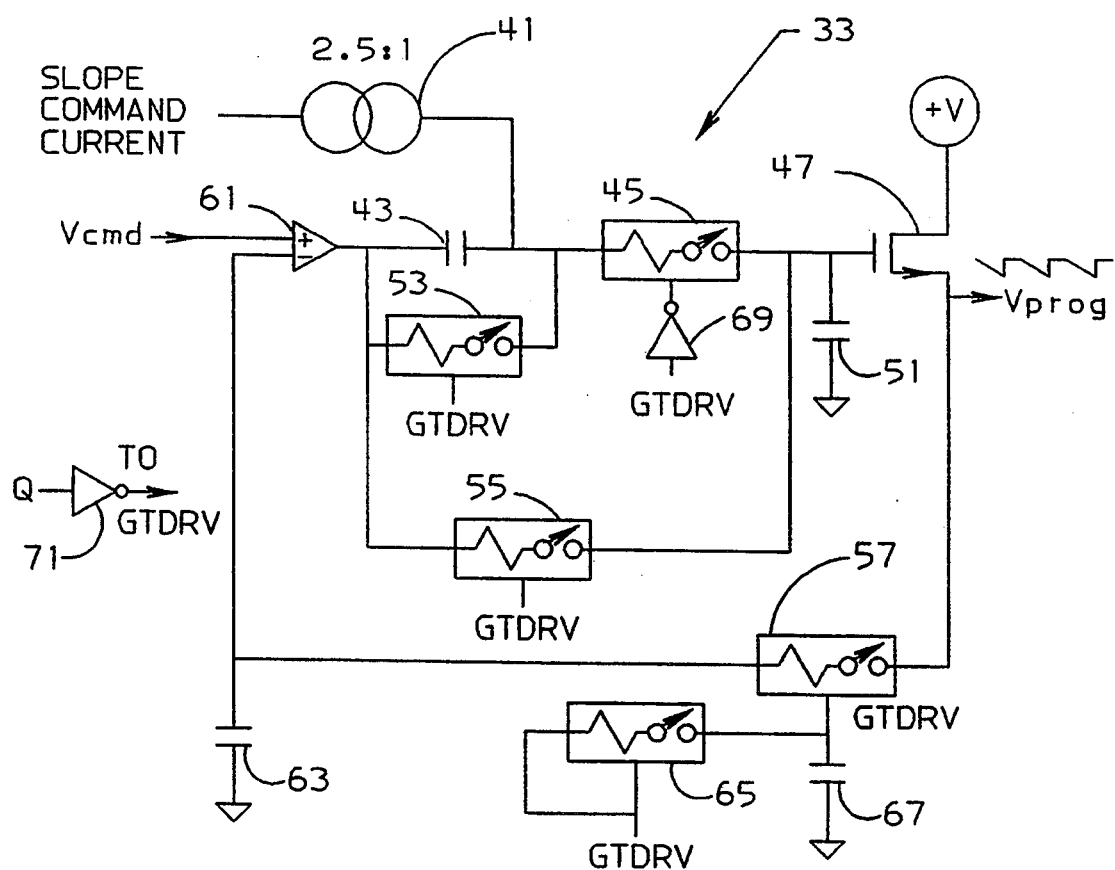
FIG. 3 is schematic diagram of a high-frequency slope compensation circuit in accordance with the present invention.

Referring now to FIG. 3, a slope compensation circuit in accordance with the present invention is provided. An external slope command current is divided by a fixed amount by a current follower circuit 41, which in the preferred embodiment reduces the current by a factor of 2.5 to one, and is connected to the junction of a slope generating capacitor 43 and the input of a switch 45. The output of the switch is connected to the gate of a source follower connected N-channel FET 47 which serves as an output driver. The gate of FET 47 is also connected through an output drive filtering capacitor 51 to ground. A switch 53 is connected across slope generating capacitor 43. A switch 55 is connected across the series combination of slope generating capacitor 43 and switch 45. The drain of FET 47 is connected to a voltage source +V. The source of FET 47 provides the output of the circuit and feedback through a switch 57 to one input of a differential amplifier 61 and through a capacitor 63 to ground. The other input to differential amplifier 61 is a voltage command signal from the output of the regulation error amplifier. The output of the differential amplifier 61 is connected to one end of slope generating capacitor 43. A switch 65 has its control terminal connected to one end of the switch. The other end of switch 65 is connected through a timing capacitor 67 to ground and to the control input of switch 57. Switches 45, 53, 55, 57, and 65 preferably comprise low noise switches of the type shown and claimed in copending application herein incorporated by reference. These switches have an on resistance of approximately 1K ohms and close when a positive logic voltage is received on the control input labeled GTDRV. Other types of transfer gates or switches performing an analog switch function can alternatively be used. The output of the flip flop Q of FIG. 2, after being inverted in an inverter 71 provides the control signal to switches 53, 55, 57, and 65 and to inverter 69. Switch 45 has an inverter 69 in series with its gate causing an inverted signal to cause the switch to close.

In operation, when FET 17 is on, diode 21 is reverse biased, and the currents in inductors 15 and 23 increase. When the current in FET 17 reaches its programmed threshold, the FET is switched off. Diode 21 conducts, the output capacitor 25 and the load (not shown) receive the sum of currents from inductors 15 and 23. The programmed threshold current is created from the error signal generated by the feedback of the converter's output voltage $v_o$, impressed across resistor 33.

The operation of the slope compensation circuit 32 will now be described in detail. A voltage command Vcmd is generated by comparing the output of a current-programmed converter to be controlled to a reference voltage. A constant current, shown as the slope command current in FIG. 2, is removed from capacitor 43, resulting in a linear voltage decrease across capacitor 43 while switch 45 is conducting and switches 53, 55, 57, and 65 are not conducting. Switch 45 conducts while the power switch FET 17 in the current programmed SEPIC converter is conducting. When the increasing current in FET 17 causes the voltage at the positive input of comparator 36 to exceed the voltage at its negative input, then the output of the SR flip flop goes low causing switches 53, 55, and 65 to close and switch 45 to open. The voltage across the capacitor is discharged and the capacitor voltage is not fed to the output driver since switch 45 is not conducting. With switch 45 open and switch 55 closed during the capacitor discharge time, capacitor 43 is bypassed, whereby a much more rapid "apparent" discharge time occurs, since the output of the differential amplifier is available at the output of driver as soon as switch 55 is closed and 45 opens. Switch 65 and capacitor 67 introduce a delay in the switching of switch 57 which acts as a feedback gate since it is in series with the output signal Vprog preventing the control signal from reaching the holding capacitor 63. The delay introduced by resistive switch 65 charging timing capacitor 67 is approximately equal to the settling time associated with the bypass gate 55 and the output drive filtering capacitor 51. This avoids feedback of the output voltage during settling time. This delay is less than the time for the slope compensating capacitor to discharge. The voltage Vprog is sampled when the voltage of capacitor 67 rises to the threshold voltage of the control input of switch 57. The sampled voltage is held by capacitor 63. The output of differential amplifier 61 provides an error signal assuring that the output of the slope compensation circuit Vprog minus the added ramp, follows the input voltage Vcmd of the slope compensation circuit. Since the external slope command current is divided down by a fixed ratio before being applied to the slope generating capacitor 43, a smaller on-chip capacitor can be used while maintaining workable values of off-chip current and resistance to generate the commanded current.

The slope compensation circuit is suitable for use with any current-programmed DC to DC switching converters including buck, boost, buck-boost, Cuk, as well as with the SEPIC converter which has been shown herein.

The foregoing has described a slope compensation circuit which allows operation at higher frequencies and which avoids feedback of an output voltage which includes the effects of a partially discharged slope capacitor without adding unnecessary delay.

While the invention has been particularly shown and described with reference to a preferred embodiment thereof, it will be understood by those skilled in the art that various changes in form and details may be made therein without departing from the spirit and scope of the invention.

What is claimed is:

1. A slope compensation circuit comprising:
   an input stage for comparing a feedback signal, with a command signal;
   an output driver for providing an output command with a periodic sawtooth ramp and for providing the feedback signal;
   a slope-generating capacitor;
   constant current means for charging said slope-generating capacitor;
   means for periodically discharging said slope-generating capacitor comprising a switched resistance connected across said slope-generating capacitor;
   first switch means for connecting and disconnecting said slope-compensating capacitor from said output driver, said switch means disconnecting said slope generating capacitor from said output driver when said slope-generating capacitor is being discharged;
   second switch means for bypassing said slope generating capacitor and coupling said input stage to said output driver when said slope-generating capacitor is being discharged; and
   a hold capacitor for receiving said feedback signal from said output driver when said slope compensating capacitor is being bypassed and for providing said signal to said input stage.

2. The slope compensation circuit of claim 1 further comprising:
   third switch means connecting said feedback signal to said hold capacitor; and
   delay means for controlling the closing of said third switch means until after said second switch means for bypassing said slope generating capacitor has settled, said delay means being initiated when said slope-generating capacitor is being discharged.

3. A circuit comprising:
   a current programmed switching DC to DC converter having a semiconductor switch for controlling the transfer of power from input to output and comparison means for comparing a signal representative of semiconductor switch current to a threshold signal for determining when to turn off said semiconductor switch;
   a slope compensation circuit for generating said threshold signal, said slope compensation circuit including an input stage for comparing a feedback signal with a command signal; an output driver for providing an output command with a periodic sawtooth ramp and for providing the feedback signal; a slope-generating capacitor; constant current means for charging said slope-generating capacitor; means for periodically discharging said slope-generating capacitor comprising a switched resistance; first switch means for connecting and disconnecting said slope-compensating capacitor from said output driver, said first switch means disconnecting said slope generating capacitor from said output driver when said slope-generating capacitor is being discharged; second switch means for bypassing said slope generating capacitor and connecting said input stage to said output driver when said slope-generating capacitor is being discharged; and a hold capacitor for receiving said feedback signal from said output driver when said slope compensating capacitor is being bypassed and for providing said signal to said input stage, said means for periodically discharging said slope-generating capacitor functioning when said semiconductor switch is not conducting.

4. The circuit of claim 3 further comprising:
   third switch means connecting said feedback signal to said hold capacitor; and
   delay means for controlling the closing of said third switch means until after said second switch means for bypassing said slope generating capacitor has settled, said delay means being initiated when said slope-generating capacitor is being discharged.

* * * * *